US012265198B2

(12) United States Patent
Jiang et al.

(10) Patent No.: US 12,265,198 B2
(45) Date of Patent: Apr. 1, 2025

(54) IN-SITU ROCK MASS ELASTIC MODULUS MEASUREMENT SYSTEM AND METHOD

(71) Applicant: INSTITUTE OF ROCK AND SOIL MECHANICS, CAS, Wuhan (CN)

(72) Inventors: Quan Jiang, Wuhan (CN); Pengfei Chen, Wuhan (CN); Xiating Feng, Wuhan (CN); Jianpo Liu, Wuhan (CN); Herui Zhao, Wuhan (CN); Xin Wang, Wuhan (CN); Jie Xin, Wuhan (CN)

(73) Assignee: INSTITUTE OF ROCK AND SOIL MECHANICS, CAS, Wuhan (CN)

( * ) Notice: Subject to any disclaimer, the term of this patent is extended or adjusted under 35 U.S.C. 154(b) by 274 days.

(21) Appl. No.: 18/049,067

(22) Filed: Oct. 24, 2022

(65) Prior Publication Data

US 2024/0012173 A1    Jan. 11, 2024

(30) Foreign Application Priority Data

Jul. 6, 2022   (CN) .......................... 202210799647.X

(51) Int. Cl.
   *G01V 9/00*   (2006.01)
   *E21B 49/00*   (2006.01)
   *G01N 3/12*   (2006.01)

(52) U.S. Cl.
   CPC .............. *G01V 9/00* (2013.01); *E21B 49/006* (2013.01); *G01N 3/12* (2013.01); *G01N 2203/0075* (2013.01)

(58) Field of Classification Search
   CPC .... G01V 9/00; G01N 3/12; G01N 2203/0075; E21B 49/006
   See application file for complete search history.

(56) References Cited

U.S. PATENT DOCUMENTS 2,181,980 A  *  12/1939  Seale .................... E21B 49/06
                                                      175/254
3,961,524 A  *  6/1976  de la Cruz ............ E21B 49/006
                                                       73/783
(Continued)

FOREIGN PATENT DOCUMENTS

CN      106769501 A  *  5/2017  ............... G01N 3/06
CN      112816336 A  *  5/2021  ........... G01L 5/0004

*Primary Examiner* — Jill E Culler
(74) *Attorney, Agent, or Firm* — Heslin Rothenberg Farley & Mesiti P.C.; Victor A. Cardona, Esq.

(57) ABSTRACT

An in-situ rock mass elastic modulus measurement system includes a controller, a telescopic rod, and a protective barrel; the telescopic rod is fixedly connected to the protective barrel; in-hole supporting structures are arranged at upper and lower ends in the protective barrel which is internally fixedly connected with a base; the base is slidably connected with a feeding sliding plate which is driven by a feeding cylinder and provided with a right-angle transmission diverter, a driving motor, and a grinding cylinder; the diverter is in transmission connection with the driving motor; two ends thereof are connected with grinding pressure heads; the diverter is driven by the grinding cylinder to translate horizontally, and drives the grinding pressure heads to outwards grind a borehole wall; a hydraulic oil cylinder is fixedly arranged on the feeding sliding plate; a displacement sensor is arranged on a cylinder body of the hydraulic oil cylinder.

18 Claims, 3 Drawing Sheets

(56) References Cited

U.S. PATENT DOCUMENTS

| | | | | |
|---|---|---|---|---|
| 4,461,171 A | * | 7/1984 | de la Cruz | E21B 49/006 73/152.59 |
| 12,091,940 B2 | * | 9/2024 | Jiang | E21B 37/02 |
| 2004/0237640 A1 | * | 12/2004 | Meister | E21B 49/006 73/152.48 |

* cited by examiner

IN-SITU ROCK MASS ELASTIC MODULUS MEASUREMENT SYSTEM AND METHOD

CROSS-REFERENCE TO RELATED APPLICATION

This application claims priority to Chinese Patent Application No. 202210799647.X, filed on Jul. 6, 2022, which is hereby incorporated by reference in its entirety.

TECHNICAL FIELD

The present disclosure relates to the technical field of in-situ rock mass elastic modulus measurement, particularly to an in-situ rock mass elastic modulus measurement system and method.

BACKGROUND

In the design and construction of geotechnical engineering, the elastic modulus of rock mass is an important parameter for the design of the geotechnical engineering. At present, methods for measuring the elastic modulus of the rock mass mainly include a laboratory measurement method and an in-situ measurement method. However, due to the inevitable disturbance on a rock core transportation process, and the complexity of rock mass structure and the diversity of components, the elastic modulus of the rock mass on the site is quite different from an elastic modulus value of a laboratory standard rock mass, and the laboratory test steps are complicated and expensive, and the test cycle is long. Therefore, it is of great significance to study and design equipment for measuring the elastic modulus of rock mass on site to learn a geological state of the geotechnical engineering and to guide the construction design.

At present, an in-situ measuring instrument commonly used in the engineering is a borehole elastic modulus instrument. There are two kinds of existing borehole elastic modulus instruments. One borehole elastic modulus instrument uses a "capsule" to uniformly load a borehole wall; and due to surface contact, a measured result is an average value of the elastic moduli in all directions. The other borehole elastic modulus instrument measures elastic moduli of a borehole in different directions using a strip-type rigid loading plate with a cambered section, which is point or line contact. This method is used in most cases at present since most rock masses are anisotropic. However, in this method, an inner wall of a curved surface of the borehole is not treated. As a result, a contact area between the rigid loading plate and surrounding rock is relatively small and non-uniform, resulting in a great difference between a measured result and a calculated result.

In view of the boundedness of the existing laboratory and in-situ test methods, it is of great significance to design a fast, simple and accurate in-situ test system for measuring the elastic modulus of rock mass. At present, an in-situ elastic modulus measurement device widely used in China can measure the modulus of borehole rock simply and quickly. However, it is not suitable for hard rock with relatively high strength. Furthermore, the existing in-situ elastic modulus measurement device is provided with a ground operating platform, is unable to adapt to soft geological conditions, has a large volume, and is inconvenient to carry, complicated in operation and relatively low in accuracy.

SUMMARY

An object of the present disclosure is to provide an in-situ rock mass elastic modulus measurement system and method, so as to solve the problems in the prior art, simplify a measurement device, improve the measurement accuracy, expand the application range, and reduce the construction cost.

In order to achieve the above-mentioned object, the present disclosure provides the following solution.

It is provided an in-situ rock mass elastic modulus measurement system, including a controller, a telescopic rod, and a protective barrel. A lower end of the telescopic rod is fixedly connected to an upper end of the protective barrel; in-hole supporting structures are arranged at upper and lower ends in the protective barrel; the in-hole supporting structures are outwards opened through first through holes on the protective barrel and supported on a borehole wall. The protective barrel is internally fixedly connected with a base; the base is slidably connected with a feeding sliding plate along a vertical direction; the feeding sliding plate is driven to slide up and down by a feeding cylinder on the base; the feeding sliding plate is provided with a right-angle transmission diverter, a driving motor, and a grinding cylinder. An input shaft of the right-angle transmission diverter is in transmission connection with an output shaft of the driving motor; an output shaft of the right-angle transmission diverter is disposed along a horizontal direction, and two ends of the right-angle transmission diverter are connected with two grinding pressure heads respectively. The right-angle transmission diverter is driven by the grinding cylinder to translate horizontally, and drives the grinding pressure heads to outwards grind the borehole wall through second through holes on the protective barrel; a hydraulic oil cylinder is fixedly arranged on the feeding sliding plate; two ends of the hydraulic oil cylinder are provided with two hydraulic rods respectively; the two hydraulic rods are telescopically disposed along a horizontal direction; two measurement pressure heads are arranged at top ends of the two hydraulic rods. A displacement sensor configured for detecting a relative displacement between the two measurement pressure heads is arranged on a cylinder body of the hydraulic oil cylinder; the measurement pressure heads press a planished surface of the borehole wall through the second through holes; the driving motor and the displacement sensor are electrically connected to the controller; and the in-hole supporting structures, the feeding cylinder, the grinding cylinder, and the hydraulic oil cylinder are all controlled by the controller.

In some embodiments, the two ends of the right-angle transmission diverter are respectively fixedly connected to a first translation plate and a second translation plate; the first translation plate and the second translation plate are fixedly connected to two ends of a linear bearing pedestal shaft respectively; the linear bearing pedestal shaft is slidably connected, along the horizontal direction, to a linear bearing pedestal fixed on the feeding sliding plate. Two ends of the grinding cylinder are provided with two grinding piston rods that work independently. The two grinding piston rods are telescopically disposed along the horizontal direction; and top ends of the two grinding piston rods are respectively fixedly connected to the first translation plate and the second translation plate.

In some embodiments, each in-hole supporting structure includes a bracing cylinder, a first disk and a second disk which are connected through a connection rod, L-shaped bracing claws, and a double-cone body. The double-cone body is formed by abutting sharp ends of two cones; an end of the bracing cylinder is fixed in the protective barrel through a fixing disk; another end of the bracing cylinder is fixedly connected to the first disk; a piston rod of the bracing cylinder passes through the first disk and is connected to the double-cone body located between the first disk and the second disk. A plurality of fixed rods are provided on a surface of the first disk facing to the second disk along a circumferential direction; a top end of each fixed rod is rotatably connected with one of the L-shaped bracing claws, the fixed rod is rotatably connected to a corner of corresponding L-shaped bracing claw. One right-angle side of each L-shaped bracing claw is arranged between two conical surfaces of the double-cone body; the piston rod of the bracing cylinder extends and retracts to drive each L-shaped bracing claw to rotate to be opened and supported on the borehole wall or to retract in the protective barrel; and the bracing cylinder is controlled by the controller.

In some embodiments, the driving motor is fixedly connected to the feeding sliding plate; and the output shaft of the driving motor is in transmission connection to the input shaft of the right-angle transmission diverter through a universal transmission joint.

In some embodiments, the controller includes an input device and a display; the display is used for displaying air pressure parameter information, oil pressure parameter information, and displacement parameter information of the measurement pressure heads.

In some embodiments, a sealing cover is arranged outside the displacement sensor; the sealing cover is fixed on the cylinder body of the hydraulic oil cylinder through a bolt; and the sealing cover and the cylinder body of the hydraulic oil cylinder are sealed by a sealing ring.

In some embodiments, two ends of the grinding cylinder are provided with two reset springs respectively; first ends of the two reset springs are fixed on a cylinder body of the grinding cylinder, and second ends thereof are fixed on the first translation plate and the second translation plate respectively; after the grinding pressure heads planish the curved surface of the borehole wall, a pressure of the grinding cylinder is relieved to be medium; and the grinding pressure heads are reset to initial states under resilience force of the reset springs.

In some embodiments, each measurement pressure head is a round rigid measurement pressure head, and the measurement pressure head is matched with the planished surface of the borehole wall.

In some embodiments, a top end of the protective barrel is provided with a main line hole; an air pump, a hydraulic pump, a cylinder solenoid valve, and a hydraulic solenoid valve are arranged outside the protective barrel. The cylinder solenoid valve and the hydraulic solenoid valve are both electrically connected to the controller; the air pump is connected to the feeding cylinder, the grinding cylinder, and the bracing cylinder through the cylinder solenoid valve. The hydraulic pump is connected to the hydraulic oil cylinder through the hydraulic solenoid valve; an air line of the cylinder solenoid valve connected to the feeding cylinder, the grinding cylinder, and the bracing cylinder extends into the barrel through the main line hole. A hydraulic line of the hydraulic solenoid valve connected to the hydraulic oil cylinder extends into the barrel through the main line hole; and a line of the controller connected to the driving motor and the displacement sensor extends into the barrel through the main line hole.

It is provided an in-situ rock mass elastic modulus measurement method, using the in-situ rock mass elastic modulus measurement system to measure, and including following steps:

S1: delivering the protective barrel to a designated position in a borehole through the telescopic rod, and opening the in-hole supporting structures to fix the protective barrel at the designated position;

S2: initiating the driving motor; driving the grinding pressure heads by means of the grinding cylinder to planish the borehole wall at two sides of the borehole to obtain two round planes which take an axial line of the borehole as a symmetry line and are parallel to each other, where a vertical distance between the two round planes is greater than a diameter of the borehole; and later stopping the driving motor to reset the grinding pressure heads to initial states;

S3: controlling the feeding sliding plate to move by the controller; aligning the measurement pressure heads with the round planes; controlling, by the hydraulic oil cylinder, the measurement pressure heads to simultaneously extend out, where pressures applied by the measurement pressure heads to the round planes are equal; after the measurement pressure heads are completely coupled with the round planes, starting to slowly increase the pressures to P1; recording, by the displacement sensor, a displacement sum L1 of the two round planes under action of P1; then continuing to increase the pressures to P2; recording, by the displacement sensor, a displacement sum L2 of the two round planes under action of P2;

S4: resetting the measurement pressure heads, and resetting the feeding sliding plate to an initial state;

S5: rotating the protective barrel by a given angle to reach another target position, and repeating steps S2-S4; and S6: calculating a stress difference $\Delta \sigma$ on contact surfaces of the measurement pressure heads according to formula (1):

$$\Delta\sigma = \frac{D^2(P_2 - P_1)}{d^2} \tag{1}$$

where: D represents an inner diameter of the hydraulic oil cylinder;

d represents a diameter of each measurement pressure head;

P1 represents a loading pressure intensity of hydraulic oil when the displacement sum of the two round planes is L1;

P2 represents a loading pressure intensity of hydraulic oil when the displacement sum of the two round planes is L2;

calculating a displacement difference between the displacement sums of the two round planes at P1 and P2 according to formula (2):

$$\Delta L = L_2 - L_1 \tag{2}$$

where: L1 represents the displacement sum of the two round planes under the action of P1;

L2 represents the displacement sum of the two round planes under the action of P2;

calculating the elastic modulus of the rock mass according to formula (3):

$$E = K_b \frac{(1+v)\Delta\sigma d}{\Delta L} \tag{3}$$

where: Kb includes a three-dimensional effect coefficient and a coefficient related to a bending effect, and is determined according to calibration;

v represents the poisson's ratio of the rock mass; and plotting points to draw a map for fitting on a computer according to various obtained elastic modulus, and calculating a final elastic modulus.

Compared with the existing art, the following technical effects are achieved in the present disclosure.

According to the in-situ rock mass elastic modulus measurement system and method provided by the present disclosure, a planishing structure is used to planish the curved surface of the inner wall of the borehole; a planar compression manner replaces traditional radial compression for a round hole, thereby improving the measurement accuracy, and this manner conforms to the measurement specification. The elastic moduli of the rock mass in different directions can be measured by means of rotating the protective barrel. The entire device is simple, convenient for a general geological drilling rig to drill a hole for measurement, and has high adaptability. By a digital monitoring and data acquisition manner, measured data can be acquired and monitored in real time, thereby simplifying workload for an operator and improving the measurement efficiency. An electrification sub-power source reduces lampblack pollution to the environment; and oil and air power resources can be recycled and repeatedly used, thus saving resources.

BRIEF DESCRIPTION OF THE DRAWINGS

In order to describe embodiments of the present disclosure or technical solutions in the existing art more clearly, drawings required to be used in the embodiments will be briefly introduced below. The drawings in the descriptions below are only some embodiments of the present disclosure. Those of ordinary skill in the art also can obtain other drawings according to these drawings without paying creative efforts.

Figure 1:
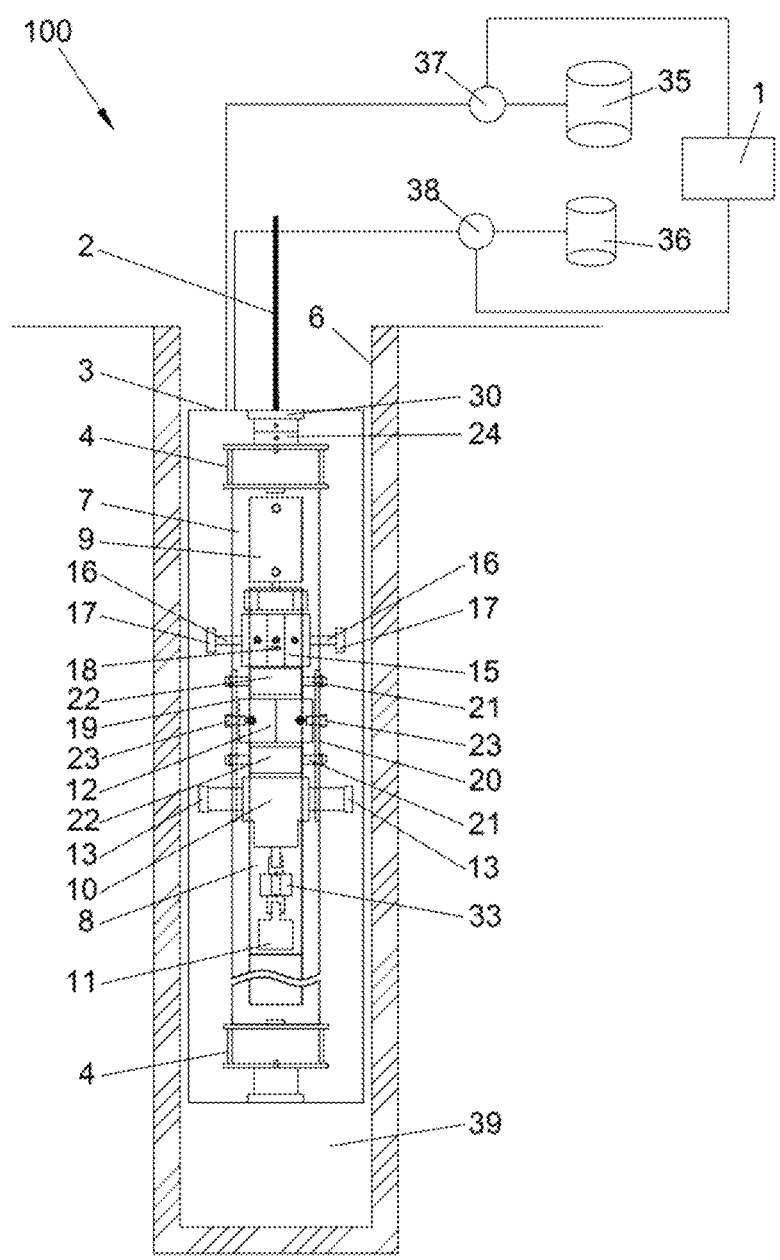
FIG. 1 is a schematic structural diagram of an in-situ rock mass elastic modulus measurement system provided by the present disclosure.

Reference numerals: 100 in-situ rock mass elastic modulus measurement system; 1 controller; 2 telescopic rod; 3 protective barrel; 4 in-hole supporting structure; 5 first through hole; 6 borehole wall; 7 base; 8 feeding sliding plate; 9 feeding cylinder; 10 right-angle transmission diverter; 11 driving motor; 12 grinding cylinder; 13 grinding pressure head; 14 second through hole; 15 hydraulic oil cylinder; 16 hydraulic rod; 17 measurement pressure head; 18 displacement sensor; 19 first translation plate; 20 second translation plate; 21 linear bearing pedestal shaft; 22 linear bearing pedestal; 23 grinding piston rod; 24 bracing cylinder; 25 connection rod; 26 first disk; 27 second disk; 28 L-shaped bracing claw; 29 double-cone body; 30 fixing disk; 31 piston rod; 32 fixed rod; 33 universal transmission joint; 34 main line hole; 35 air pump; 36 hydraulic pump; 37 cylinder solenoid valve; 38 hydraulic solenoid valve; and 39 borehole.

DETAILED DESCRIPTION OF THE EMBODIMENTS

The technical solutions in the embodiments of the present disclosure will be described clearly and completely below in combination with the accompanying drawings of the embodiments of the present disclosure. Apparently, the described embodiments are only part of the embodiments of the present disclosure, not all embodiments.

The terminology used herein for the purpose of describing particular examples is not intended to be limiting for further examples. Whenever a singular form such as "a", "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises", "comprising", "includes" and/or "including", when used, specify the presence of the stated features, integers, steps, operations, processes, acts, elements and/or components, but do not preclude the presence or addition of one or more other features, integers, steps, operations, processes, acts, elements, components and/or any group thereof.

Figure 2:
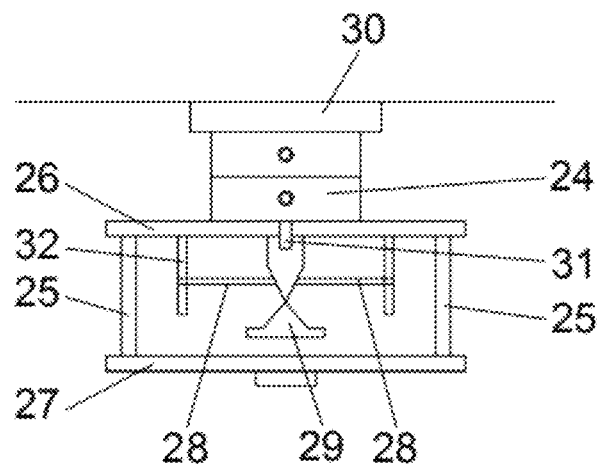
FIG. 2 is a schematic structural diagram of an in-hole supporting structure in the present disclosure.
Figure 3:
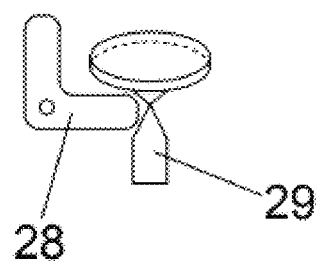
FIG. 3 is a schematic diagram showing a positional relationship between an L-shaped bracing claw and a double-cone body in the present disclosure.
Figure 4:
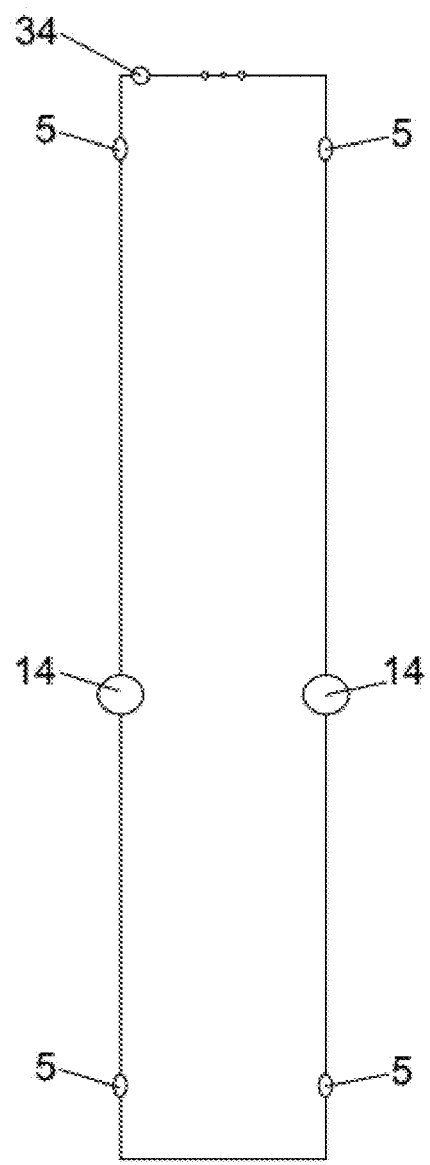
FIG. 4 is a schematic structural diagram of a protective barrel in the present disclosure.

As shown in FIG. 1 to FIG. 4, this embodiment provides an in-situ rock mass elastic modulus measurement system 100, including a controller 1, a telescopic rod 2, and a protective barrel 3. A lower end of the telescopic rod 2 is fixedly connected to an upper end of the protective barrel 3; in-hole supporting structures 4 are arranged at upper and lower ends in the protective barrel 3; the in-hole supporting structures 4 can be outwards opened through first through holes 5 on the protective barrel 3 and supported on a borehole wall 6. The protective barrel 3 is internally fixedly connected with a base 7; the base 7 is slidably connected with a feeding sliding plate 8 along a vertical direction. The feeding sliding plate 8 is driven to slide up and down by a feeding cylinder 9 on the base 7; the feeding sliding plate 8 is provided with a right-angle transmission diverter 10, a driving motor 11, and a grinding cylinder 12. An input shaft of the right-angle transmission diverter 10 is in transmission connection with an output shaft of the driving motor 11. An output shaft of the right-angle transmission diverter 10 is disposed along a horizontal direction, and each of two ends is connected with one grinding pressure head 13. The right-angle transmission diverter 10 is driven by the grinding cylinder 12 to translate horizontally, and the grinding pressure heads 13 are brought to outwards grind the borehole wall 6 through second through holes 14 on the protective barrel 3. A hydraulic oil cylinder 15 is fixedly arranged on the feeding sliding plate 8; two ends of the hydraulic oil cylinder 15 are provided with two hydraulic rods 16 respectively. The two hydraulic rods 16 are telescopically disposed along a horizontal direction; top ends of the two hydraulic rods 16 are provided with two measurement pressure heads 17 respectively; a displacement sensor 18 used for detecting a relative displacement between the two measurement pressure heads 17 is arranged on a cylinder body of the hydraulic oil cylinder 15. The measurement pressure heads 17 press a planished surface of the borehole wall 6 through the second through holes 14; the driving motor 11 and the displacement sensor 18 are electrically connected to the controller 1; and the in-hole supporting structures 4, the feeding cylinder 9, the grinding cylinder 12, and the hydraulic oil cylinder 15 are all controlled by the controller 1.

During use, the grinding pressure heads 13 are used to planish the curved surface of the inner wall of the borehole; a planar compression manner replaces traditional radial compression for a round hole, so that the measurement accuracy is improved, and this manner conforms to the measurement specification; and the elastic moduli of the rock mass in different directions can be measured by means of rotating the protective barrel 3. The entire device is simple, and convenient for a general geological drilling rig to drill a hole for measurement, and has high adaptability. By adoption of a digital monitoring and data acquisition manner, measured data can be acquired and monitored in real time, so that workload for an operator is simplified, and the measurement efficiency is improved. An electrification sub-power source reduces lampblack pollution to the environment; and oil and air power resources can be recycled and repeatedly used, thus saving resources. The grinding pressure heads 13 may use diamond grinding pressure heads. The diamond grinding pressure heads can grind hard rock with relatively high strength. The elastic modulus of the hard rock is measured, and the application range of the device is expanded.

In this embodiment, two ends of the right-angle transmission diverter 10 are respectively fixedly connected to a first translation plate 19 and a second translation plate 20; the first translation plate 19 and the second translation plate 20 are respectively fixedly connected to two ends of a linear bearing pedestal shaft 21; the linear bearing pedestal shaft 21 is slidably connected, along the horizontal direction, to a linear pedestal bearing 22 fixed on the feeding sliding plate 8. Two ends of the grinding cylinder 12 are provided with two grinding piston rods 23 that work independently; the two grinding piston rods 23 are telescopically disposed along the horizontal direction; and top ends of the two grinding piston rods 23 are respectively fixedly connected to the first translation plate 19 and the second translation plate 20. Two sides of the borehole wall 6 are ground by means of respectively driving the two grinding piston rods 23. Each of an upper end and a lower end of each of the first translation plate 19 and the second translation plate 20 is provided with one linear bearing pedestal shaft 21; each linear bearing pedestal shaft 21 is slidably connected to one linear bearing pedestal 22, so that the first translation plate 19 and the second translation plate 20 translate more stably. Under the restraining action of the first translation plate 19 and the second translation plate 20, the translation of the right-angle transmission diverter 10 is more stable, so that the purpose of forming two parallel round planes that are symmetric about an axial line of the borehole, on the inner wall of the borehole, can be achieved.

In this embodiment, each in-hole supporting structure 4 includes a bracing cylinder 24, a first disk 26 and a second disk 27 which are connected through a connection rod 25, L-shaped bracing claws 28, and a double-cone body 29; the double-cone body 29 is formed by abutting the sharp ends of two cones. One end of the bracing cylinder 24 is fixed in the protective barrel 3 through a fixing disk 30; the other end of the bracing cylinder 24 is fixedly connected to the first disk 26. A piston rod 31 of the bracing cylinder 24 passes through the first disk 26 and is connected to the double-cone body 29 located between the first disk 26 and the second disk 27. A plurality of fixed rods 32 are provided on a surface of the first disk 26 facing to the second disk 27 along a circumferential direction. A top end of each fixed rod 32 is rotatably connected with one L-shaped bracing claw 28; the fixed rod 32 is rotatably connected to a corner of the L-shaped bracing claw 28. One right-angle side of each L-shaped bracing claw 28 is arranged between two conical surfaces of the double-cone body 29. The piston rod 31 of the bracing cylinder 24 extends and retracts to drive each L-shaped bracing claw 28 to rotate to be opened and supported on the borehole wall 6 or to retract in the protective barrel 3; and the bracing cylinder 24 is controlled by the controller 1. The piston rod 31 of the bracing cylinder 24 extends and retracts to drive the double-cone body 29 to move up and down; the upper and lower conical surfaces of the double-cone body 29 can push one right-edge side located between the two conical surfaces of the double-cone body 29, so that the L-shaped bracing claw 28 rotates, and the other right-angle side of the L-shaped bracing claw 28 is outwards opened or inwards closed to be supported on the borehole wall 6 or retract in the protective barrel 3.

In this embodiment, the driving motor 11 is fixedly connected to the feeding sliding plate 8; and the output shaft of the driving motor 11 is in transmission connection to the input shaft of the right-angle transmission diverter 10 through a universal transmission joint 33, which ensures that the driving motor 11 can still provide rotating force for the right-angle transmission diverter 10 when the right-angle transmission diverter 10 moves.

In this embodiment, the controller 1 includes an input device and a display; and the display is used for displaying air pressure parameter information, oil pressure parameter information, and displacement parameter information of the measurement pressure heads 17. Thus, an operator can read or observe changes of an air pressure parameter, an oil pressure parameter, and a displacement parameter more intuitively and in real time in the entire process of measuring the elastic modulus of the rock, so that the in-situ rock mass elastic modulus measurement device is more convenient to use.

In this embodiment, a sealing cover is arranged outside the displacement sensor 18; the sealing cover is fixed on the cylinder body of the hydraulic oil cylinder 15 through a bolt; and the sealing cover and the cylinder body of the hydraulic oil cylinder 15 are sealed by a sealing ring, so as to protect the displacement sensor 18 and avoid it from being damaged.

In this embodiment, each of two ends of the grinding cylinder 12 is provided with one reset spring; one end of each of the two reset springs is fixed on the cylinder body of the grinding cylinder 12, and the other ends of the two rest springs are respectively fixed on the first translation plate 19 and the second translation plate 20. After the grinding pressure heads 13 planish the curved surface of the borehole wall 6, the pressure of the grinding cylinder 12 is relieved to be medium; and the grinding pressure heads 13 can be reset to initial states under the resilience force of the reset springs. After the grinding is completed, and air in the grinding cylinder 12 is pumped out for pressure relief, the grinding pressure heads 13 are self-reset to the initial states, so that the operating process is simplified.

In this embodiment, each measurement pressure head 17 is a round rigid measurement pressure head, and the measurement pressure head 17 can be matched with the planished surface of the borehole wall 6. Using the round rigid measurement pressure head as the pressure head, the pressure heads can be completely matched with the planished surface in the borehole, thereby improving the measurement accuracy.

In this embodiment, a top end of the protective barrel 3 is provided with a main line hole 34; an air pump 35, a hydraulic pump 36, a cylinder solenoid valve 37, and a hydraulic solenoid valve 38 are arranged outside the protective barrel 3; the cylinder solenoid valve 37 and the hydraulic solenoid valve 38 are both electrically connected to the controller 1. The air pump 35 is connected to the feeding cylinder 9, the grinding cylinder 12, and the bracing cylinder 24 respectively through the cylinder solenoid valve 37; the hydraulic pump 36 is connected to the hydraulic oil cylinder 15 through the hydraulic solenoid valve 38; an air line of the cylinder solenoid valve 37 connected to the feeding cylinder 9, the grinding cylinder 12, and the bracing cylinder 24 extends into the barrel through the main line hole 34. A hydraulic line of the hydraulic solenoid valve 38 connected to the hydraulic oil cylinder 15 extends into the barrel through the main line hole 34. A line of the controller 1 connected to the driving motor 11 and the displacement sensor 18 extends into the barrel through the main line hole 34. A front hydraulic cavity, a middle hydraulic cavity, and a rear hydraulic cavity are arranged in the hydraulic oil cylinder 15; the front hydraulic cavity, the middle hydraulic cavity, and the rear hydraulic cavity are respectively connected to the hydraulic solenoid valve 38 respectively through hydraulic lines. Hydraulic oil is injected into the middle hydraulic cavity, so that the two hydraulic rods 16 at the two ends can simultaneously extend out to drive the two measurement pressure heads 17 to extend out of the protective barrel 3 and be in contact with the planished surface of the borehole wall 6, thus achieving the purpose that the measurement pressure heads simultaneously extend out to perform planar loading on the two parallel round planes in the borehole to measure the elastic modulus in the rock mass.

An in-situ rock mass elastic modulus measurement method is provided, which achieves measurement using the above-mentioned in-situ rock mass elastic modulus measurement system 100, and includes the following steps:

S1: the protective barrel 3 is delivered to a designated position in a borehole 39 through the telescopic rod 2, and the in-hole supporting structures 4 are opened to fix the protective barrel 3 at the designated position;

S2: the driving motor 11 is initiated; the grinding pressure heads 13 are driven by means of the grinding cylinder 12 to grind the borehole wall 6 at two sides of the borehole 39 to obtain two round planes which take an axial line of the borehole as a symmetry line and are parallel to each other, where a vertical distance between the two round planes is greater than a diameter of the borehole 39; and later the driving motor 11 is stopped to reset the grinding pressure heads 13 to initial states;

S3: the controller 1 controls the feeding sliding plate 8 to move; the measurement pressure heads 17 are aligned with the round planes; the hydraulic oil cylinder 15 controls the measurement pressure heads 17 on two sides to simultaneously extend out, where pressures applied by the measurement pressure heads on two sides to the round planes are equal; after the measurement pressure heads 17 are completely coupled with the round planes, the pressure is started to be slowly increased to P1; the displacement sensor 18 records a displacement sum L1 of the two round planes under the action of P1; the pressure is continued to be increased to P2; the displacement sensor 18 records a displacement sum L2 of the two round planes under the action of P2;

S4: the measurement pressure heads 17 are set, and the feeding sliding plate 8 is reset to an initial state;

S5: the protective barrel 3 is rotated by a certain angle to reach another target position, and steps S2-S4 are repeated; and S6: a stress difference $\Delta\sigma$ on contact surfaces of the measurement pressure heads 17 is calculated according to formula (1):

$$\Delta\sigma = \frac{D^2(P_2 - P_1)}{d^2} \quad (1)$$

where: D represents an inner diameter of the hydraulic oil cylinder;
d represents a diameter of the measurement pressure head;
P1 represents a loading pressure intensity of hydraulic oil when the displacement sum of the two round planes is L1;
P2 represents a loading pressure intensity of hydraulic oil when the displacement sum of the two round planes is L2;
a displacement difference between the displacement sums of the two round planes at P1 and P2 is calculated according to formula (2);

$$\Delta L = L_2 - L_1 \quad (2)$$

where: L1 represents the displacement sum of the two round planes under the action of P1;
L2 represents the displacement sum of the two round planes under the action of P2;
calculating the elastic modulus of the rock mass according to formula (3):

$$E = K_b \frac{(1 + v)\Delta\sigma d}{\Delta L} \quad (3)$$

where: Kb includes a three-dimensional effect coefficient and a coefficient related to a bending effect, and is determined according to calibration;
v represents the poisson's ratio of the rock mass; and
points are plotted to draw a map for fitting on a computer according to the various obtained elastic moduli, and a final elastic modulus is calculated.

In step S1, the borehole 39 with a diameter of 110 mm and a standard depth can be drilled at the designated position by a drilling rig; in step S2, the diameter of the grinding pressure head 13 is preferably 25 mm; the round plane with a diameter of 25 mm is obtained through the grinding pressure head 13; and in step S3, the diameter of the measurement pressure head is preferably 20 mm, and P1 and P2 can be measured through the hydraulic solenoid valve 38.

The principle and implementation modes of the present disclosure are described by applying specific examples in the present disclosure. The descriptions of the above embodiments are only intended to help to understand the method of the present disclosure and a core idea of the method. In addition, those ordinarily skilled in the art can make changes to the specific implementation modes and the application scope according to the idea of the present disclosure. From the above, the contents of this specification shall not be deemed as limitations to the present disclosure.

What is claimed is:

1. An in-situ rock mass elastic modulus measurement system, comprising a controller, a telescopic rod, and a protective barrel, wherein a lower end of the telescopic rod is fixedly connected to an upper end of the protective barrel; in-hole supporting structures are arranged at upper and lower ends in the protective barrel; the in-hole supporting structures are outwards opened through first through holes on the protective barrel and supported on a borehole wall; the protective barrel is internally fixedly connected with a base; the base is slidably connected with a feeding sliding plate along a vertical direction; the feeding sliding plate is driven to slide up and down by a feeding cylinder on the base; the feeding sliding plate is provided with a right-angle transmission diverter, a driving motor, and a grinding cylinder; an input shaft of the right-angle transmission diverter is in transmission connection with an output shaft of the driving motor; an output shaft of the right-angle transmission diverter is disposed along a horizontal direction, and two ends of the right-angle transmission diverter are connected with two grinding pressure heads respectively; the right-angle transmission diverter is driven by the grinding cylinder to translate horizontally, and drives the grinding pressure heads to outwards grind the borehole wall through second through holes on the protective barrel; a hydraulic oil cylinder is fixedly arranged on the feeding sliding plate; two ends of the hydraulic oil cylinder are provided with two hydraulic rods respectively; the two hydraulic rods are telescopically disposed along a horizontal direction; two measurement pressure heads are arranged at top ends of the two hydraulic rods; a displacement sensor configured for detecting a relative displacement between the two measurement pressure heads is arranged on a cylinder body of the hydraulic oil cylinder; the measurement pressure heads press a planished surface of the borehole wall through the second through holes; the driving motor and the displacement sensor are electrically connected to the controller; and the in-hole supporting structures, the feeding cylinder, the grinding cylinder, and the hydraulic oil cylinder are all controlled by the controller.

2. The in-situ rock mass elastic modulus measurement system according to claim 1, wherein the two ends of the right-angle transmission diverter are respectively fixedly connected to a first translation plate and a second translation plate; the first translation plate and the second translation plate are fixedly connected to two ends of a linear bearing pedestal shaft respectively; the linear bearing pedestal shaft is slidably connected, along the horizontal direction, to a linear bearing pedestal fixed on the feeding sliding plate; two ends of the grinding cylinder are provided with two grinding piston rods that work independently; the two grinding piston rods are telescopically disposed along the horizontal direction; and top ends of the two grinding piston rods are respectively fixedly connected to the first translation plate and the second translation plate.

3. The in-situ rock mass elastic modulus measurement system according to claim 2, wherein two ends of the grinding cylinder are provided with two reset springs respectively; first ends of the two reset springs are fixed on a cylinder body of the grinding cylinder, and second ends thereof are fixed on the first translation plate and the second translation plate respectively; after the grinding pressure heads planish the curved surface of the borehole wall, a pressure of the grinding cylinder is relieved to be medium; and the grinding pressure heads are reset to initial states under resilience force of the reset springs.

4. The in-situ rock mass elastic modulus measurement system according to claim 1, wherein each in-hole supporting structure comprises a bracing cylinder, a first disk and a second disk which are connected through a connection rod, L-shaped bracing claws, and a double-cone body; the double-cone body is formed by abutting sharp ends of two cones; an end of the bracing cylinder is fixed in the protective barrel through a fixing disk; another end of the bracing cylinder is fixedly connected to the first disk; a piston rod of the bracing cylinder passes through the first disk and is connected to the double-cone body located between the first disk and the second disk; a plurality of fixed rods are provided on a surface of the first disk facing to the second disk along a circumferential direction; a top end of each fixed rod is rotatably connected with one of the L-shaped bracing claws, the fixed rod is rotatably connected to a corner of corresponding L-shaped bracing claw; one right-angle side of each L-shaped bracing claw is arranged between two conical surfaces of the double-cone body; the piston rod of the bracing cylinder extends and retracts to drive each L-shaped bracing claw to rotate to be opened and supported on the borehole wall or to retract in the protective barrel; and the bracing cylinder is controlled by the controller.

5. The in-situ rock mass elastic modulus measurement system according to claim 4, wherein a top end of the protective barrel is provided with a main line hole; an air pump, a hydraulic pump, a cylinder solenoid valve, and a hydraulic solenoid valve are arranged outside the protective barrel; the cylinder solenoid valve and the hydraulic solenoid valve are both electrically connected to the controller, the air pump is connected to the feeding cylinder, the grinding cylinder, and the bracing cylinder respectively through the cylinder solenoid valve; the hydraulic pump is connected to the hydraulic oil cylinder through the hydraulic solenoid valve; an air line of the cylinder solenoid valve connected to the feeding cylinder, the grinding cylinder, and the bracing cylinder extends into the barrel through the main line hole; a hydraulic line of the hydraulic solenoid valve connected to the hydraulic oil cylinder extends into the barrel through the main line hole; and a line of the controller connected to the driving motor and the displacement sensor extends into the barrel through the main line hole.

6. The in-situ rock mass elastic modulus measurement system according to claim 1, wherein the driving motor is fixedly connected to the feeding sliding plate; and the output shaft of the driving motor is in transmission connection to the input shaft of the right-angle transmission diverter through a universal transmission joint.

7. The in-situ rock mass elastic modulus measurement system according to claim 1, wherein the controller comprises an input device and a display; the display is used for displaying air pressure parameter information, oil pressure parameter information, and displacement parameter information of the measurement pressure heads.

8. The in-situ rock mass elastic modulus measurement system according to claim 1, wherein a sealing cover is arranged outside the displacement sensor; the sealing cover is fixed on the cylinder body of the hydraulic oil cylinder through a bolt; and the sealing cover and the cylinder body of the hydraulic oil cylinder are sealed by a sealing ring.

9. The in-situ rock mass elastic modulus measurement system according to claim 1, wherein each measurement pressure head is a round rigid measurement pressure head, and the measurement pressure head is matched with the planished surface of the borehole wall.

10. An in-situ rock mass elastic modulus measurement method, using an in-situ rock mass elastic modulus measurement system to measure, wherein the system comprises a controller, a telescopic rod, and a protective barrel; wherein a lower end of the telescopic rod is fixedly connected to an upper end of the protective barrel; in-hole supporting structures are arranged at upper and lower ends in the protective barrel; the in-hole supporting structures are outwards opened through first through holes on the protective barrel and supported on a borehole wall; the protective barrel is internally fixedly connected with a base; the base is slidably connected with a feeding sliding plate along a vertical direction; the feeding sliding plate is driven to slide up and down by a feeding cylinder on the base; the feeding sliding plate is provided with a right-angle transmission diverter, a driving motor, and a grinding cylinder; an input shaft of the right-angle transmission diverter is in transmission connection with an output shaft of the driving motor; an output shaft of the right-angle transmission diverter is disposed along a horizontal direction, and two ends of the right-angle transmission diverter are connected with two grinding pressure heads respectively; the right-angle transmission diverter is driven by the grinding cylinder to translate horizontally, and drives the grinding pressure heads to outwards grind the borehole wall through second through holes on the protective barrel; a hydraulic oil cylinder is fixedly arranged on the feeding sliding plate; two ends of the hydraulic oil cylinder are provided with two hydraulic rods respectively; the two hydraulic rods are telescopically disposed along a horizontal direction; two measurement pressure heads are arranged at top ends of the two hydraulic rods; a displacement sensor configured for detecting a relative displacement between the two measurement pressure heads is arranged on a cylinder body of the hydraulic oil cylinder; the measurement pressure heads press a planished surface of the borehole wall through the second through holes; the driving motor and the displacement sensor are electrically connected to the controller; and the in-hole supporting structures, the feeding cylinder, the grinding cylinder, and the hydraulic oil cylinder are all controlled by the controller;

the method comprises:

step 1: delivering the protective barrel to a designated position in a borehole through the telescopic rod, and opening the in-hole supporting structures to fix the protective barrel at the designated position;

step 2: initiating the driving motor; driving the grinding pressure heads by means of the grinding cylinder to planish the borehole wall at two sides of the borehole to obtain two round planes which take an axial line of the borehole as a symmetry line and are parallel to each other, wherein a vertical distance between the two round planes is greater than a diameter of the borehole; and later stopping the driving motor to reset the grinding pressure heads to initial states;

step 3: controlling the feeding sliding plate to move by the controller; aligning the measurement pressure heads with the round planes; controlling, by the hydraulic oil cylinder, the measurement pressure heads to simultaneously extend out, wherein pressures applied by the measurement pressure heads to the round planes are equal; after the measurement pressure heads are completely coupled with the round planes, starting to slowly increase the pressures to $P_1$; recording, by the displacement sensor, a displacement sum $L_1$ of the two round planes under action of $P_1$; then continuing to increase the pressures to $P_2$; recording, by the displacement sensor, a displacement sum $L_2$ of the two round planes under action of $P_2$;

step 4: resetting the measurement pressure heads, and resetting the feeding sliding plate to an initial state;

rotating the protective barrel by a given angle to reach another target position, and repeating the steps 2-4; and calculating a stress difference $\Delta\sigma$ on contact surfaces of the measurement pressure heads according to formula (1):

$$\Delta\sigma = \frac{D^2(P_2 - P_1)}{d^2} \qquad (1)$$

wherein D represents an inner diameter of the hydraulic oil cylinder, d represents a diameter of each measurement pressure head, $P_1$ represents a loading pressure intensity of hydraulic oil when the displacement sum of the two round planes is $L_1$, $P_2$ represents a loading pressure intensity of hydraulic oil when the displacement sum of the two round planes is $L_2$;

calculating a displacement difference between the displacement sums of the two round planes at $P_1$ and $P_2$ according to formula (2):

$$\Delta L = L_2 - L_1 \qquad (2)$$

wherein $L_1$ represents the displacement sum of the two round planes under the action of $P_1$, $L_2$ represents the displacement sum of the two round planes under the action of $P_2$, calculating the elastic modulus of the rock mass according to formula (3):

$$E = K_b \frac{(1+v)\Delta\sigma d}{\Delta L} \qquad (3)$$

wherein $K_b$ comprises a three-dimensional effect coefficient and a coefficient related to a bending effect, and is determined according to calibration, v represents the poisson's ratio of the rock mass; and plotting points to draw a map for fitting on a computer according to various obtained elastic moduli, and calculating a final elastic modulus.

11. The in-situ rock mass elastic modulus measurement method according to claim 10, wherein the two ends of the right-angle transmission diverter are respectively fixedly connected to a first translation plate and a second translation plate; the first translation plate and the second translation plate are fixedly connected to two ends of a linear bearing pedestal shaft respectively; the linear bearing pedestal shaft is slidably connected, along the horizontal direction, to a linear bearing pedestal fixed on the feeding sliding plate; two ends of the grinding cylinder are provided with two grinding piston rods that work independently; the two grinding piston rods are telescopically disposed along the horizontal direction; and top ends of the two grinding piston rods are respectively fixedly connected to the first translation plate and the second translation plate.

12. The in-situ rock mass elastic modulus measurement method according to claim 11, wherein two ends of the grinding cylinder are provided with two reset springs respectively; first ends of the two reset springs are fixed on a cylinder body of the grinding cylinder, and second ends thereof are fixed on the first translation plate and the second translation plate respectively; after the grinding pressure heads planish the curved surface of the borehole wall, a pressure of the grinding cylinder is relieved to be medium; and the grinding pressure heads are reset to initial states under resilience force of the reset springs.

13. The in-situ rock mass elastic modulus measurement method according to claim 10, wherein each in-hole supporting structure comprises a bracing cylinder, a first disk and a second disk which are connected through a connection rod, L-shaped bracing claws, and a double-cone body; the double-cone body is formed by abutting sharp ends of two cones; an end of the bracing cylinder is fixed in the protective barrel through a fixing disk; another end of the bracing cylinder is fixedly connected to the first disk; a piston rod of the bracing cylinder passes through the first disk and is connected to the double-cone body located between the first disk and the second disk; a plurality of fixed rods are provided on a surface of the first disk facing to the second disk along a circumferential direction; a top end of each fixed rod is rotatably connected with one of the L-shaped bracing claws, the fixed rod is rotatably connected to a corner of corresponding L-shaped bracing claw; one right-angle side of each L-shaped bracing claw is arranged between two conical surfaces of the double-cone body; the piston rod of the bracing cylinder extends and retracts to drive each L-shaped bracing claw to rotate to be opened and supported on the borehole wall or to retract in the protective barrel; and the bracing cylinder is controlled by the controller.

14. The in-situ rock mass elastic modulus measurement method according to claim 13, wherein a top end of the protective barrel is provided with a main line hole; an air pump, a hydraulic pump, a cylinder solenoid valve, and a hydraulic solenoid valve are arranged outside the protective barrel; the cylinder solenoid valve and the hydraulic solenoid valve are both electrically connected to the controller; the air pump is connected to the feeding cylinder, the grinding cylinder, and the bracing cylinder respectively through the cylinder solenoid valve; the hydraulic pump is connected to the hydraulic oil cylinder through the hydraulic solenoid valve; an air line of the cylinder solenoid valve connected to the feeding cylinder, the grinding cylinder, and the bracing cylinder extends into the barrel through the main line hole; a hydraulic line of the hydraulic solenoid valve connected to the hydraulic oil cylinder extends into the barrel through the main line hole; and a line of the controller connected to the driving motor and the displacement sensor extends into the barrel through the main line hole.

15. The in-situ rock mass elastic modulus measurement method according to claim 10, wherein the driving motor is fixedly connected to the feeding sliding plate; and the output shaft of the driving motor is in transmission connection to the input shaft of the right-angle transmission diverter through a universal transmission joint.

16. The in-situ rock mass elastic modulus measurement method according to claim 10, wherein the controller comprises an input device and a display; the display is used for displaying air pressure parameter information, oil pressure parameter information, and displacement parameter information of the measurement pressure heads.

17. The in-situ rock mass elastic modulus measurement method according to claim 10, wherein a sealing cover is arranged outside the displacement sensor; the sealing cover is fixed on the cylinder body of the hydraulic oil cylinder through a bolt; and the sealing cover and the cylinder body of the hydraulic oil cylinder are sealed by a sealing ring.

18. The in-situ rock mass elastic modulus measurement method according to claim 10, wherein each measurement pressure head is a round rigid measurement pressure head, and the measurement pressure head is matched with the planished surface of the borehole wall.

\* \* \* \* \*